(12) United States Patent
Kuwabara

(10) Patent No.: US 6,223,036 B1
(45) Date of Patent: Apr. 24, 2001

(54) ADJACENT CELL MONITORING METHOD AND MOBILE STATION

(75) Inventor: Kenji Kuwabara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/006,884

(22) Filed: Jan. 14, 1998

(30) Foreign Application Priority Data

Jan. 16, 1997 (JP) .................................................... 9-005490

(51) Int. Cl.[7] ...................................................... H04Q 7/20
(52) U.S. Cl. .............................. 455/434; 455/62; 455/437
(58) Field of Search ............................ 455/434, 436–439, 455/455, 442, 516, 62

(56) References Cited

U.S. PATENT DOCUMENTS

| 5,117,502 | * | 5/1992 | Onoda et al. | 455/436 |
| 5,157,661 | * | 10/1992 | Kanai et al. | 455/436 |
| 5,404,573 | | 4/1995 | Yabe et al. | |
| 5,539,748 | * | 7/1996 | Raith | 455/38.3 |
| 6,044,270 | * | 3/2000 | Raith | 455/434 |

FOREIGN PATENT DOCUMENTS

| 2 756 130 | 5/1998 | (FR) . |
| 1-321739 | 12/1989 | (JP) . |
| 2-44823 | 2/1990 | (JP) . |
| 3-268697 | 11/1991 | (JP) . |
| 4-37334 | 2/1992 | (JP) . |
| 4-181828 | 6/1992 | (JP) . |
| 4-213931 | 8/1992 | (JP) . |
| 5-235843 | 9/1993 | (JP) . |
| 6-46473 | 2/1994 | (JP) . |
| 7-222231 | 8/1995 | (JP) . |

* cited by examiner

Primary Examiner—Doris H. To
(74) Attorney, Agent, or Firm—Sughrue, Mion, Zinn, Macpeak & Seas, PLLC

(57) ABSTRACT

A voice component effectiveness judging section takes as input voice parameters from a voice component extraction section and determines whether or not an effective voice component is present that is sufficient for transmission to base stations. The output from the voice component effectiveness judging section is sent to a control section. If this output indicates that an effective voice component is present, the controller controls a modulator, transmitter, and synthesizer such that voice transmission is carried out in the transmission time slot. If the output indicates that an effective voice component is not present, the controller effects control such that in the transmission time slot, the synthesizer tunes to the radio frequency of the control channel of the adjacent base stations and the receiver and demodulator measure received fields.

5 Claims, 9 Drawing Sheets

R: RECEPTION
T: TRANSMISSION
M: MEASUREMENT OF RECEIVED SIGNAL
   STRENGTH OF ADJACENT BASE STATIONS

R: RECEPTION
M: MEASUREMENT OF RECEIVED SIGNAL
   STRENGTH OF ADJACENT BASE STATIONS

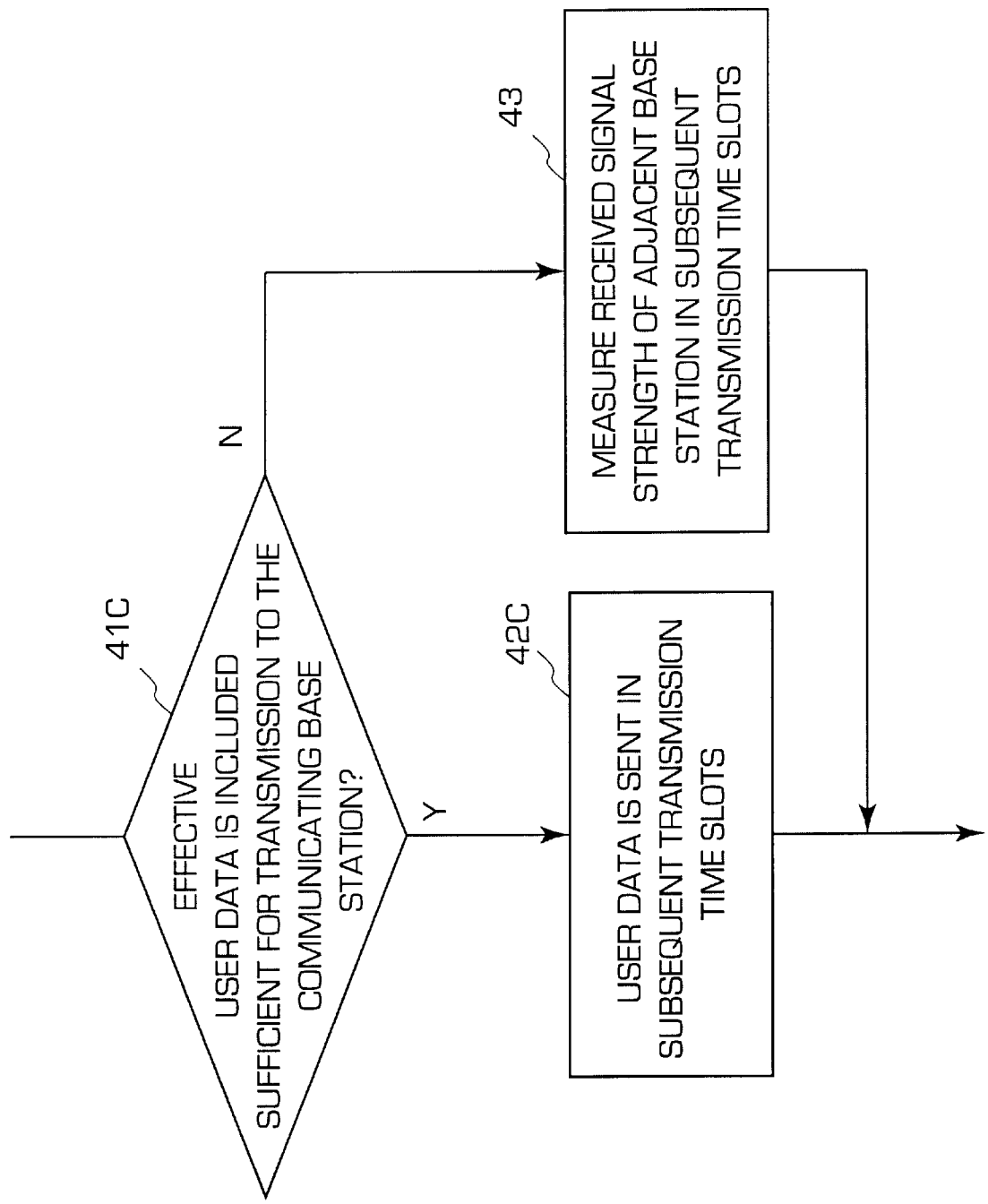

ADJACENT CELL MONITORING METHOD AND MOBILE STATION

BACKGROUND OF THE INVENTION

1. Field of the Invention

The present invention relates to a digital time division mobile communication system having separate time slots for transmission and reception at a mobile station, and more particularly to an adjacent cell monitoring method.

2. Description of the Related Art

As described for example in Japanese Patent Laid-open No. 327139/89, this type of adjacent cell monitoring is performed with the object of realizing a mobile communication method that enables constant optimum connection with a base station without deterioration in transmission quality as a mobile station moves from one zone to another.

FIG. 1 is a block diagram showing the channel switching method in mobile communication of the prior art. Mobile communication exchange 61 is connected to public switch telephone net work 60, and base stations 62, 63, and 64 each having radio zones 65, 66, and 67, respectively, are each connected to mobile communication exchange 61.

While communicating with base station 63, mobile station 68 sequentially scans the control channel signals of base station 63 with which it is currently communicating as well as of adjacent base stations 62 and 64 at times other than during the time slots assigned to mobile station 68, receives signals, measures the reception quality of these signals, selects the optimum base station based on these measurement results, and transmits optimum base station information to base station 63 with which it is communicating. Based on this optimum base station information that it receives by way of base station 63, mobile communication exchange 61 then switches the base station connected to mobile station 68.

The above-described prior art has a disadvantage that a certain amount of time is required before the optimum base station is selected.

This delay arises from the necessity of measuring the reception quality of adjacent base stations before the optimum base station can be selected. Reception quality is found from the base station having the highest received signal strength after measuring the received signal strength of adjacent base stations. In order to eliminate the influence of fading, the measurement of received signal strength generally requires taking a plurality of measurements, for example, five measurements, spaced out by measurement intervals and calculating the average value. The number of received signal strength measurements required is therefore the product of the number of base stations in the vicinity and the number of received signal strength measurements per base station. Carrying out received signal strength measurements equal in number to this product in the time intervals outside the time slots assigned to the mobile station is time consuming.

SUMMARY OF THE INVENTION

It is an object of the present invention to provide an adjacent cell monitoring method in digital time division mobile communication system that allow a reduction in the time necessary for selecting the optimum base station.

The first mobile station according to the present invention is provided with a voice component effectiveness judging section and a controller. A digital voice signal from a voice A/D converter is resolved into its voice components in a voice component extracting section. As input, the voice component effectiveness judging section takes voice parameters from the voice component extracting section and determines whether or not the voice parameter includes an effective voice component sufficient for transmission to the communicating base station. The output of the voice component effectiveness judging section is transmitted to the controller. If the output includes a message that an effective voice component is included, the controller controls a modulator, a transmitter, and a synthesizer such that voice transmission is performed in the transmission time slot. If the output does not include a message that an effective voice component is not included, the controller effects control such that, in the transmission time slot, the synthesizer tunes to the radio frequency of the control channels of adjacent base stations and the receiver and demodulator measure the signal strength.

According to another embodiment of the present invention, in accordance with a signal indicating the presence or absence of call connection information sent to the communicating base station, the controller similarly effects measurement of received signal strength of adjacent base stations in the transmission time slot if there is no call connection information.

According to another embodiment of the present invention, in accordance with a signal indicating the presence or absence of user data sent to the communicating base station, the controller similarly effects measurement of received signal strength of adjacent base stations in the transmission time slot if there is no user data information.

The present invention can shorten the time required to select the optimum base station by taking advantage of transmission time slots not required for transmitting speech or data to measure the received signal strength of adjacent base stations, thus enabling more rapid switching to an adjacent base station. The reason for this more rapid switching is that the transmission time slot assigned to a mobile station can be used for measuring the received signal strength of adjacent base stations in cases in which the transmission time slot is not being used for transmission of speech or data, thereby allowing completion of the required number of received signal strength measurements in a shorter time.

In addition, the present invention enables an increase in the number of measurements of received signal strength of adjacent base stations per unit of time, thereby enabling a reduction in the influence of fading and an increase in the reliability of measured values of received signal strength. This is because the transmission time slot assigned to a mobile station can be used for measurement of received signal strength of adjacent base stations when the transmission time slot is not being used for transmission, thereby enabling an increase in the number of measurements of received signal strength of base stations per unit of time.

The above and other objects, features, and advantages of the present invention will become apparent from the following description with references to the accompanying drawings which illustrate examples of the present invention.

BRIEF DESCRIPTION OF THE DRAWINGS

FIG. 11 is a flow chart illustrating the adjacent cell monitoring operation in the third embodiment.

DETAILED DESCRIPTION OF THE PREFERRED EMBODIMENTS

Figure 1:
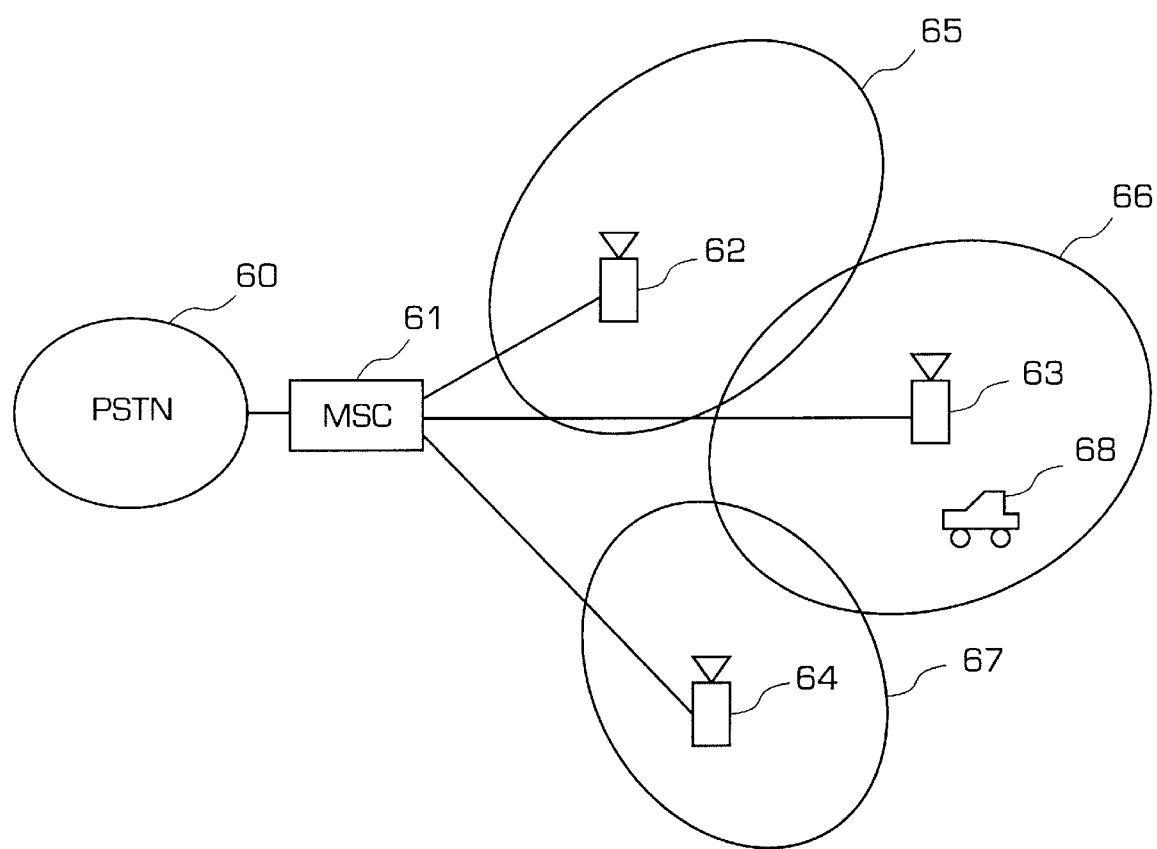
FIG. 1 is a block diagram showing an example of the prior art.
Figure 2:
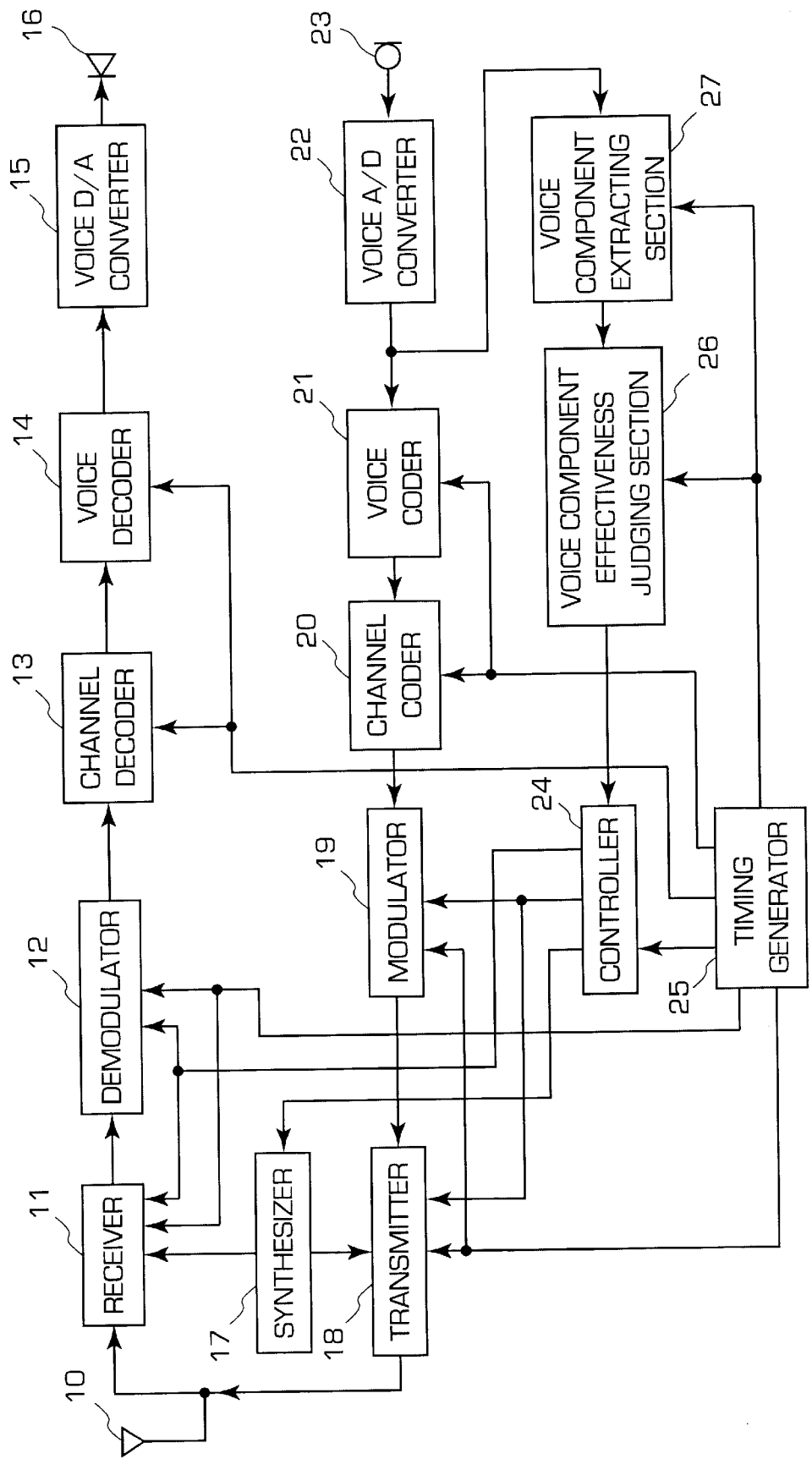
FIG. 2 is a block diagram showing a mobile station according to the first embodiment of the present invention.
Figure 3:
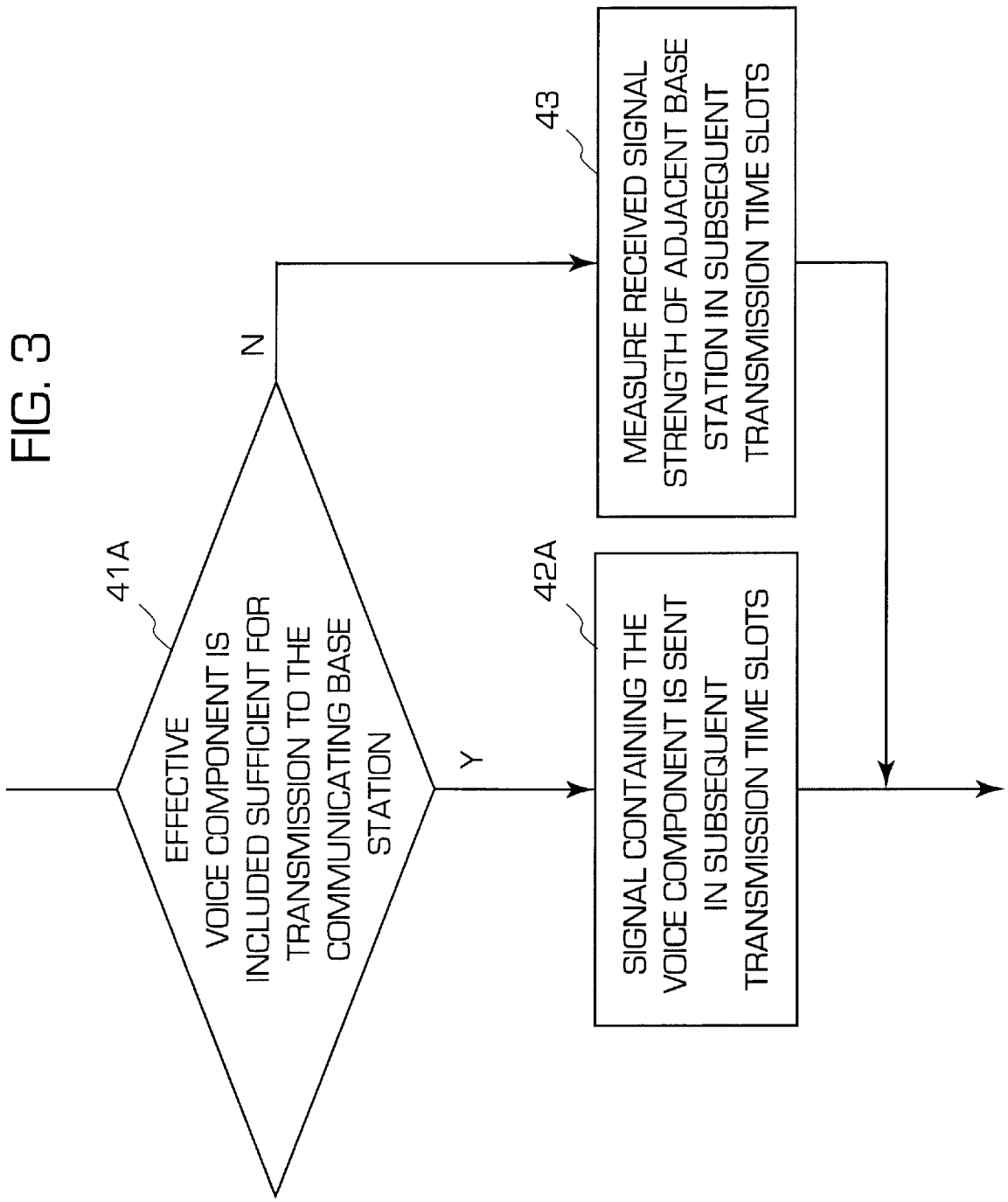
FIG. 3 is a flow chart illustrating the adjacent cell monitoring operation in the first embodiment.

Referring to FIG. 2, the mobile station according to the first embodiment of the present invention consists of antenna 10, receiver 11, demodulator 12, channel decoder 13, voice decoder 14, voice D/A converter 15, speaker 16, synthesizer 17, transmitter 18, modulator 19, channel coder 20, voice coder 21, voice A/D converter 22, microphone 23, controller 24, timing generator 25, voice component effectiveness judging section 26, and voice component extracting section 27.

Voice A/D converter 22 converts the analog voice signal inputted from microphone 23 to a digital signal. Voice coder 21 compresses the data of the digital signal from voice A/D converter 22. Channel coder 20 encodes data from voice coder 21 so as to enable detection and correction when receiving errors likely to have been generated on the radio transmission path. Modulator 19 modulates signals outputted from channel coder 20. Transmitter 18 converts the frequency of signals from modulator 19, amplifies the signals to a stipulated power, and sends the signals to antenna 10. Regarding the receiving system, receiver 11 converts the frequency of signals from antenna 10 and amplifies the signals. Demodulator 12 converts the signals from receiver 11 to digital signals. Channel decoder 13 detects errors contained in the received signals and corrects wherever possible. Voice decoder 14 expands signals from channel decoder 13. Voice D/A converter 15 converts from digital signals to analog signals and outputs from speaker 16.

The received signal strength of adjacent base stations are measured by receiver and demodulator 12 of the above-described receiving system and synthesizer 17. The digital voice signal sent from voice A/D converter 22 is also inputted to voice component extracting section 27, and the above-described digital voice signal is partitioned at a particular interval and resolved into voice components. The results of this resolution represent predetermined voice parameters by numerical values. Voice component effectiveness judging section 26 takes as input the voice parameters from voice component extracting section 27 and determines whether or not an effective voice component is included that is sufficient for transmission to the communicating base station (Step 41A). The output from voice component effectiveness judging section 26 is sent to control section 24. If the message of this output is that an effective voice component is included that is sufficient for transmission to the communicating base station, controller 24 controls modulator 19, transmitter 18, and synthesizer 17 such that the signal containing the voice component is sent in subsequent transmission time slots (Step 42A). If the message of this output is that an effective voice component is not included, controller 24 effects control such that in subsequent transmission time slots, synthesizer 17 tunes to the radio frequency of the control channels of adjacent base stations and receiver 11 and demodulator 12 measure received signal strength (Step 43).

Timing generator 25 supplies timing signals to the entire device. Synthesizer 17 supplies the necessary frequency to transmitter 18 and receiver 11.

Figure 4:
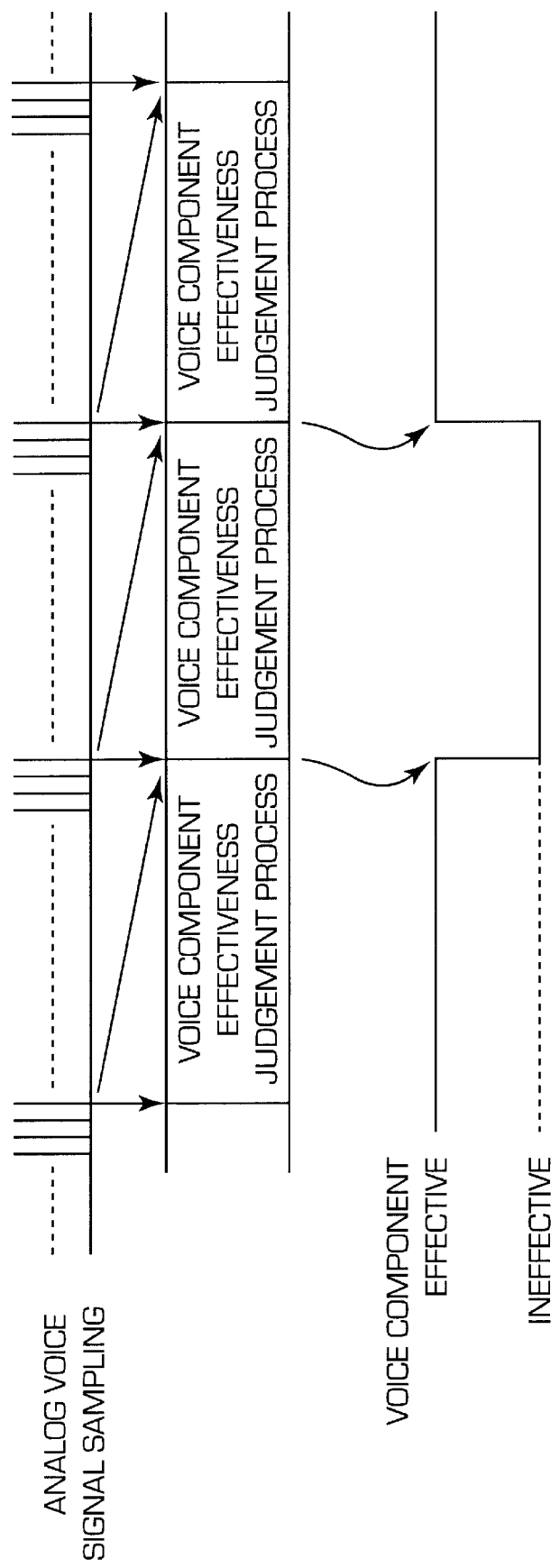
FIG. 4 shows the change over time of the output of voice component effectiveness judging section 26.
Figure 5:
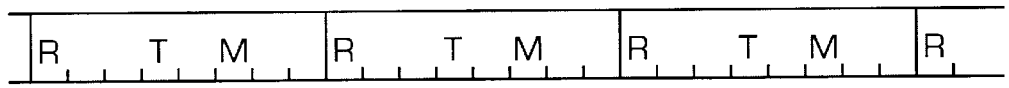
FIG. 5 shows the position of time slots for reception, transmission, and measurement of received signal strength of adjacent base stations within one TDMA (Time Division Multiple Access)
Figure 6:
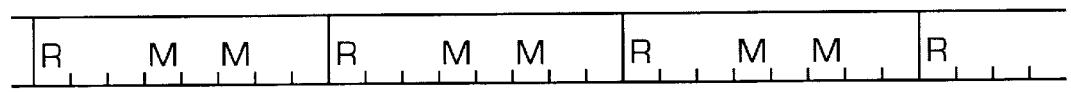
FIG. 6 shows the position of time slots of reception and measurement of received signal strength of adjacent base stations for a case in which a transmission time slot is assigned to measurement of received signal strength of adjacent base stations.
Figure 7:
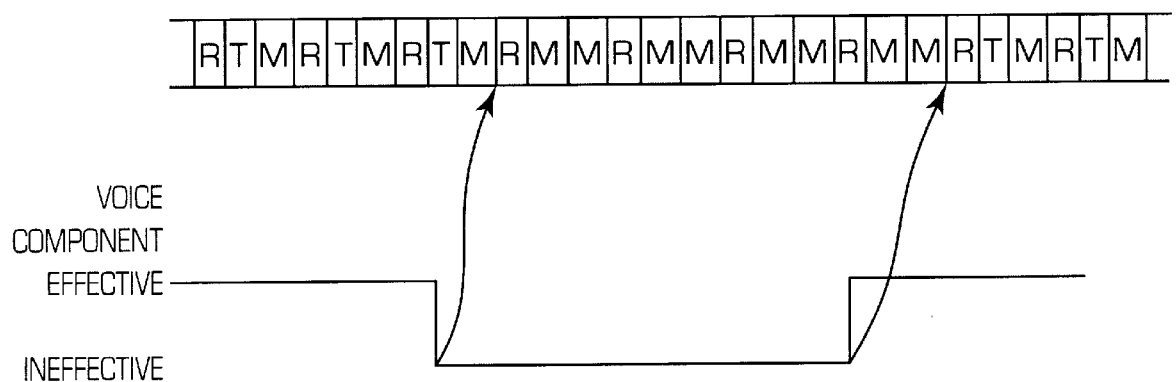
FIG. 7 shows the relation between the change of a signal indicating effective/ineffective outputted from voice component effectiveness judging section 26 to the sequence of reception, transmission, and measurement of received signal strength of adjacent base stations in one TDMA.

FIG. 4 shows the change over time of the output of voice component effectiveness judging section 26. FIG. 5 shows the position of time slots for reception, transmission, and measurement of received signal strength of adjacent base stations in one normal TDMA. FIG. 6 shows the position of time slots for a case in which measurement of the received signal strength of adjacent base stations takes the place of transmission, and FIG. 7 shows the time relationship between the output of voice component effectiveness judging section 26 and the operation of reception, transmission, and the measurement of received signal strength of adjacent base stations in one TDMA. Essentially, reception, transmission, and measurement of received signal strength of adjacent base stations are carried out sequentially if the voice parameter includes an effective voice component that is sufficient for transmission to the communicating base station, but if the voice parameter does not include an effective voice component, the sequence switches to: reception, measurement of received signal strength of adjacent base stations, and measurement of received signal strength of adjacent base stations.

Figure 8:
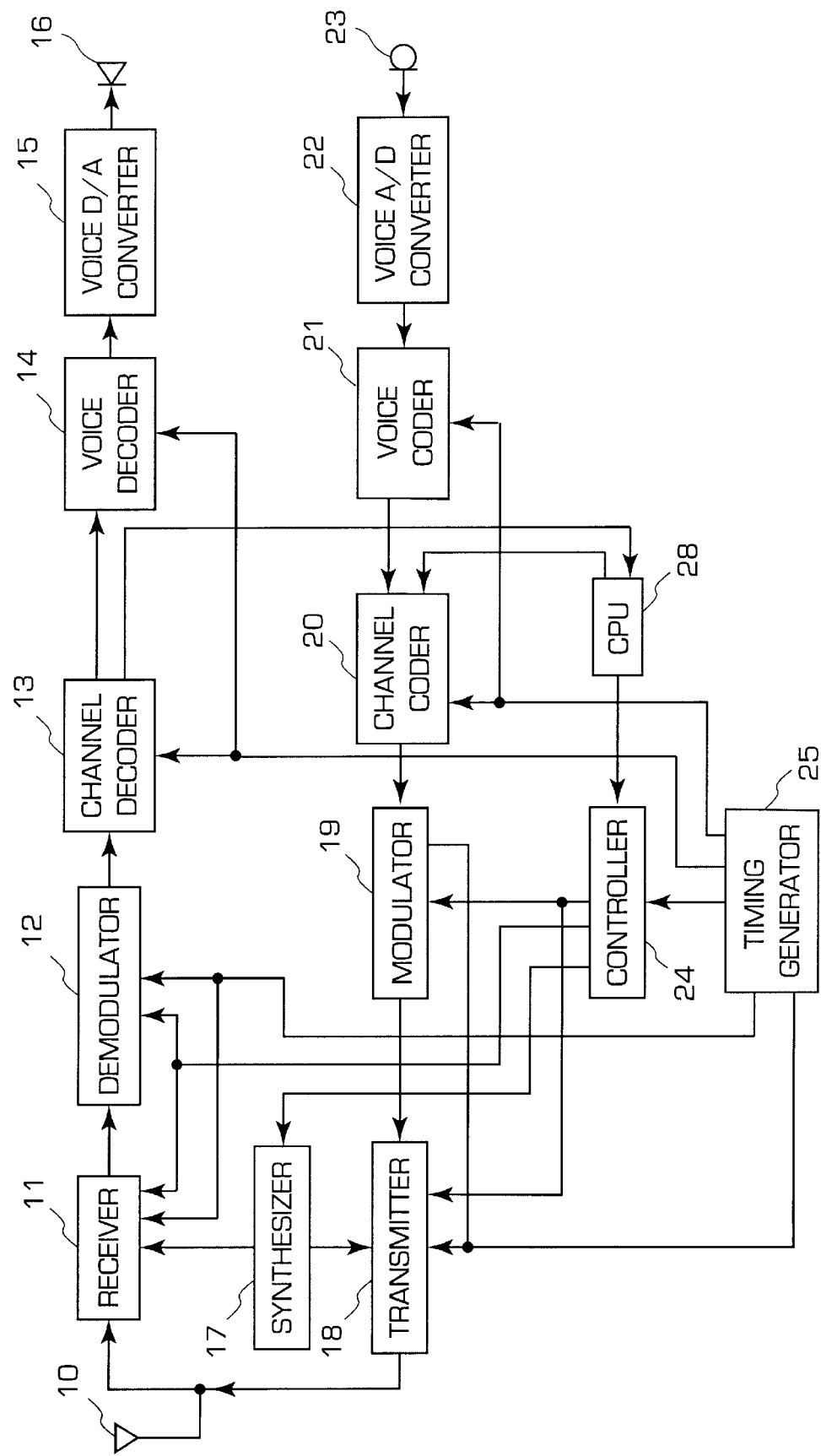
FIG. 8 is a block diagram showing a mobile station according to the second embodiment of the present invention.
Figure 9:
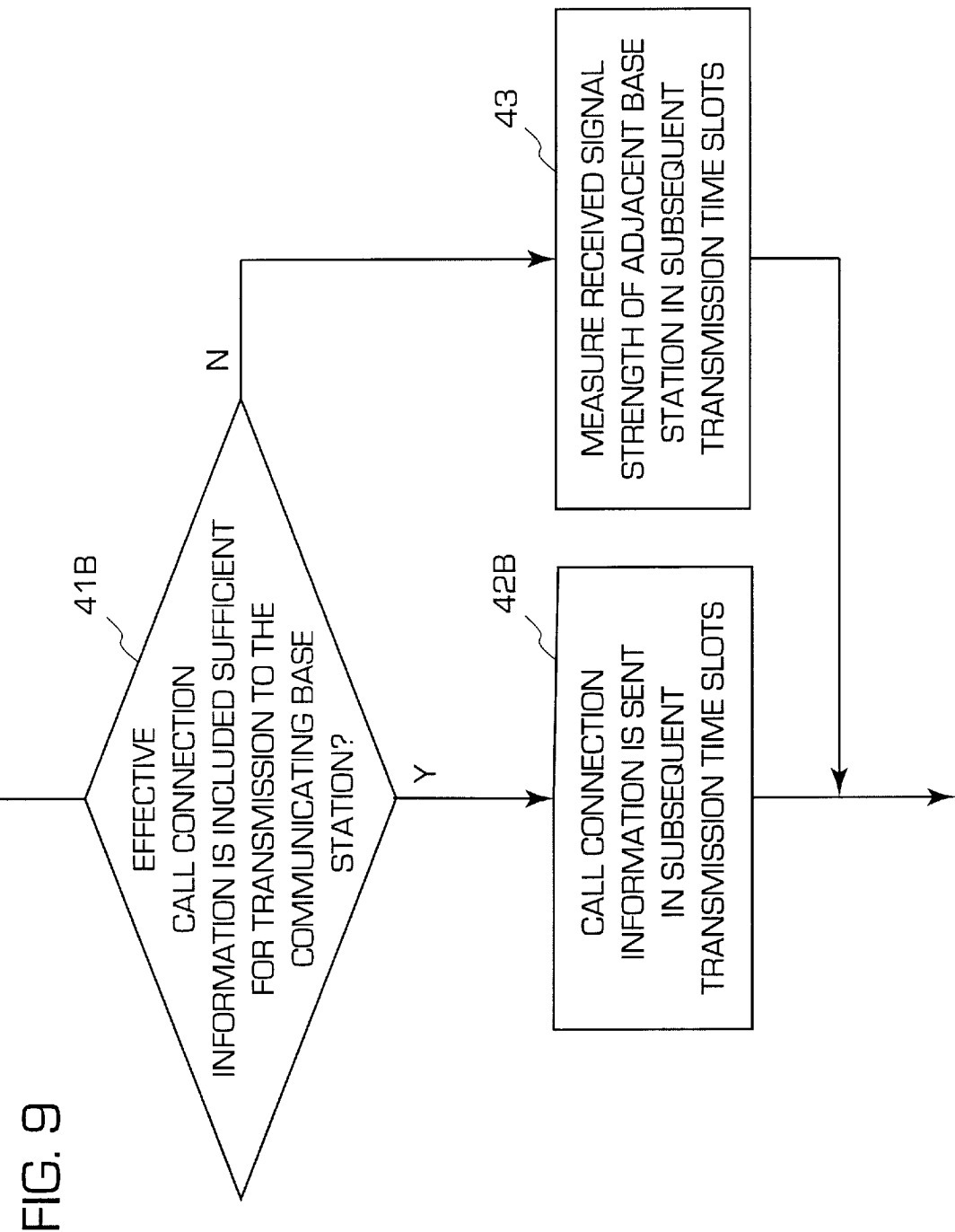
FIG. 9 is a flow chart illustrating the adjacent cell monitoring operation in the second embodiment.

Referring to FIG. 8 and FIG. 9, a mobile station according to the second embodiment of the present invention operates in accordance with a signal indicating the presence or absence of call connection information that is outputted from CPU 28, which directs call connection information, and that is sent to base stations, whereby controller 24 effects measurement of the received signal strength of adjacent base stations in the transmission time slot as in the first embodiment if there is no call connection information (Steps 41B, 42B, and 43).

Figure 10:
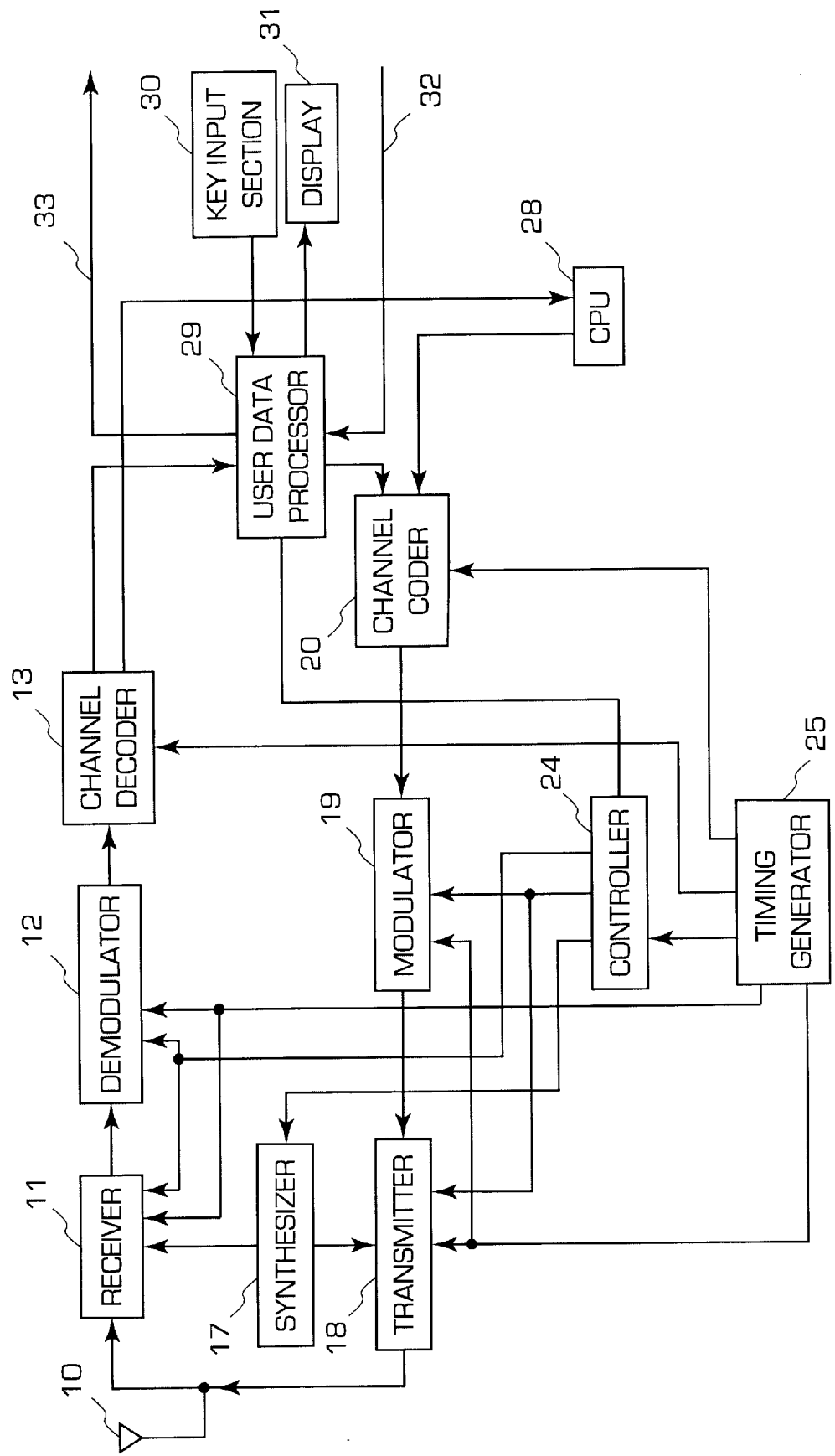
FIG. 10 is a block diagram showing a mobile station according to the third embodiment of the present invention.

Referring to FIG. 10, the mobile station of the third embodiment of the present invention is provided with user data processor 29, key input section 30, and display 31 in place of voice decoder 14, voice D/A converter 15, speaker 16, microphone 23, voice A/D converter 22, and voice coder 21 of the second embodiment. Each type of parameter of the user data is designated to the user data processor by means of key input section 30. The different parameters include the data length, speed, asynchronous/synchronous, and the presence and absence of parity (including designation of odd and even numbers), of the user data. Display 31 is a means for receiving display data from user data processor 29 and providing a user interface relating to the display. In addition to ordinary display, display data include the display of each parameter of user data or displays for making settings.

This embodiment operates in accordance with a signal indicating the presence or absence of user data that is outputted from user data processor 29, which governs the transmission and reception of user data, and that is sent to base stations, whereby controller 24 effects measurement of the received signal strength of adjacent base stations in the transmission time slot similar to the first embodiment if user data is not present (Steps 41C, 42C, 43).

In addition, data corresponding to data from key input section 30 and data corresponding to data to display 31 can pass by way of user data interface lines 32 and 33 to external devices of user data processor 29 without passing through key input section 30 and display 31.

While preferred embodiments of the present invention have been described using specific terms, such description is for illustrative purposes only, and it is to be understood that changes and variations may be made without departing from the spirit or scope of the following claims.

What is claimed is:

1. An adjacent cell monitoring method in a digital time division mobile communication system having separate time slots that differ in time for transmitting and receiving in a mobile station, comprising the step of:

determining whether or not effective call connection information is sufficient for including the effective call connection information in transmission to a communicating base station; and if effective call connection information is not sufficient to be included, effecting control such that, instead of transmitting call connection information to the communicating base station, a synthesizer inside said mobile station tunes to a radio frequency of a control channel of adjacent base stations and the received signal strength of an adjacent base station is measured.

2. A mobile station in a digital time mobile communication system having separate time slots that differ in time for transmitting and receiving in a mobile station, said mobile station comprising:

voice A/D converter means for converting an inputted analog voice signal to a digital voice signal;

voice coder means for data-compressing said digital voice signal;

channel coder means for encoding data from said voice coder means;

modulator means for modulating a signal outputted from said channel coder means;

transmitter means for converting the frequency of and amplifying a signal from said modulator means;

receiver means for converting the frequency of and amplifying a signal from an antenna;

demodulating means for converting a signal from said receiver means to a digital signal;

synthesizing means for supplying a required frequency to said transmitter means and said receiver means;

voice component extracting means for inputting a digital voice signal, dividing the digital voice signal at a particular interval, and extracting a voice component within this interval;

voice component effectiveness judging means for judging whether or not an effective voice component is sufficient within an extracted voice component for transmission to a communicating base station;

controller means for, if an effective voice component sufficient for transmission to the communicating base station is included, controlling said modulator means, said transmitter means, and said synthesizer means such that a signal including the voice component is transmitted in subsequent transmission time slots, and if an effective voice component is not included, for controlling such that, in subsequent transmission time slots, said synthesizer means tunes to a radio frequency of a control channel of adjacent base stations and said receiver means and said demodulator means measure received signal strength of adjacent base stations.

3. A mobile station in a digital time division mobile communication system having separate time slots that differ in time for transmitting and receiving in a mobile station, said mobile station comprising:

CPU means for governing information exchange for call connecting with a communicating base station and outputting a signal indicating the presence and absence of call connection information to be sent to a communicating base station;

channel coder means for encoding data from said CPU means;

modulator means for modulating a signal outputted from said channel coder means;

transmitter means for converting the frequency of and amplifying a signal from said modulator means;

receiver means for converting the frequency of and amplifying a signal from an antenna;

demodulator means for converting a signal from said receiver means to a digital signal;

synthesizer means for supplying a required frequency to said transmitter means and said receiver means; and controller means for, if call connection information is present, controlling said modulator means, said transmitter means, and said synthesizer means such that call connection information is transmitted in subsequent transmission time slots, and if call connection information is not present, controlling such that, in subsequent transmission time slots, said synthesizer means tunes to a radio frequency of a control channel of adjacent base stations and said receiver means and said demodulator means measure received signal strength of adjacent base stations.

4. A mobile station in a digital time division mobile communication system having separate time slots that differ in time for transmitting and receiving in a mobile station, said mobile station comprising:

user data processor means for transmitting and receiving user data via an external apparatus and said user data processor means outputting a signal indicating the presence and absence of user data to be sent to a communication partner;

channel coder means for encoding data from said user data processor means;

modulator means for modulating a signal outputted from said channel coder means;

transmitter means for converting the frequency of and amplifying a signal from said modulator means;

receiver means for converting the frequency of and amplifying a signal from an antenna;

demodulator means for converting a signal from said receiver means to a digital signal;

synthesizer means for supplying a required frequency to said transmitter means and said receiver means; and controller means for, if user data is present, controlling said modulator means, said transmitter means, and said synthesizer means such that a signal containing a user data component is transmitted in subsequent transmission time slots, and if user data is not present, controlling such that, in subsequent transmission time slots, said synthesizer means tunes to a radio frequency of a control channel of adjacent base stations and said receiver means and said demodulator means measure received signal strength of adjacent base stations.

5. A mobile station according to claim 4, further comprising key input means for designating each type of parameter of user data to said user data processor means; and display means for displaying display data from said user data processor means.

* * * * *

UNITED STATES PATENT AND TRADEMARK OFFICE
CERTIFICATE OF CORRECTION

PATENT NO. : 6,223,036 B1  
DATED : April 24, 2001  
INVENTOR(S) : Kenji Kuwabara Page 1 of 1

It is certified that error appears in the above-identified patent and that said Letters Patent is hereby corrected as shown below:

<u>Column 3,</u>  
Line 60, after "receiver" insert -- 11 --

Signed and Sealed this

Twenty-ninth Day of January, 2002

Attest:

*Attesting Officer*

JAMES E. ROGAN  
*Director of the United States Patent and Trademark Office*